(12) United States Patent
Saha et al.

(10) Patent No.: US 10,052,811 B2
(45) Date of Patent: Aug. 21, 2018

(54) WRINKLED SURFACES WITH TUNABLE HIERARCHY AND METHODS FOR THE PREPARATION THEREOF

(71) Applicants: Sourabh Kumar Saha, Newton, MA (US); Martin Luther Culpepper, Georgetown, MA (US)

(72) Inventors: Sourabh Kumar Saha, Newton, MA (US); Martin Luther Culpepper, Georgetown, MA (US)

(73) Assignee: SORURABH KUMAR SAHA, Livermore, CA (US)

( * ) Notice: Subject to any disclaimer, the term of this patent is extended or adjusted under 35 U.S.C. 154(b) by 280 days.

(21) Appl. No.: 14/669,925

(22) Filed: Mar. 26, 2015

(65) Prior Publication Data

US 2015/0197058 A1 Jul. 16, 2015

Related U.S. Application Data

(60) Provisional application No. 61/970,434, filed on Mar. 26, 2014.

(51) Int. Cl.
*B32B 3/00* (2006.01)
*B29C 59/02* (2006.01)
(Continued)

(52) U.S. Cl.
CPC .......... *B29C 59/02* (2013.01); *B29C 33/3878* (2013.01); *B29C 33/42* (2013.01);
(Continued)

(58) Field of Classification Search
CPC ....... B29C 61/00; B29C 39/003; B29C 39/02; B29C 39/026; B29C 59/18; B32B 27/06;
(Continued)

(56) References Cited

U.S. PATENT DOCUMENTS 7,081,269 B2 7/2006 Yang et al.
7,195,733 B2 3/2007 Rogers et al.
(Continued)

OTHER PUBLICATIONS

Eehern J Wong, Modeling and Control of Rapid Cure in Polydimethylsiloxane (PDMS) for Microfluidic Device Applications, MIT PhD thesis, 2010, Massachusetts Institute of Technology, Cambridge, MA, USA.
(Continued)

*Primary Examiner* — Megha M Gaitonde

(57) ABSTRACT

This invention relates to the low-cost manufacture of a tunable physical topographic pattern and more particularly to the manufacture of micro and nano scale hierarchical periodic wrinkle patterns that are generated upon compression of supported thin films. Disclosed herein is (i) a composite material with tunable hierarchical wrinkle patterns, wherein the composite material comprises a stretched and pre-patterned base layer and a thin film that is conformally attached to the pre-patterned surface of the base layer, (ii) a method of fabricating the pre-patterned base via pattern replication, and (iii) a method of fabricating tunable hierarchical wrinkle patterns, wherein the pattern can be deterministically switched across the hierarchical and non-hierarchical states via strain control.

23 Claims, 9 Drawing Sheets

(51) Int. Cl.
  *B29C 33/38*   (2006.01)
  *B29C 33/42*   (2006.01)
  *B29C 39/26*   (2006.01)
  *B29C 59/18*   (2006.01)
  *B29C 71/02*   (2006.01)
  *B29L 31/00*   (2006.01)
  *B29K 83/00*   (2006.01)

(52) U.S. Cl.
  CPC ............ *B29C 33/424* (2013.01); *B29C 39/26* (2013.01); *B29C 59/022* (2013.01); *B29C 59/026* (2013.01); *B29C 59/18* (2013.01); *B29C 71/02* (2013.01); *B29C 2059/023* (2013.01); *B29K 2083/00* (2013.01); *B29L 2031/756* (2013.01); *B29L 2031/772* (2013.01); *Y10T 428/24521* (2015.01)

(58) Field of Classification Search
  CPC ....... B32B 27/08; B32B 27/16; B32B 27/283; Y10T 428/24174; Y10T 428/24628; Y10T 428/24669; Y10T 428/24686; Y10T 428/24694–428/24711; H01L 23/4985; G03F 7/0002; G03F 7/0035; G03F 7/0037
  USPC ....... 428/119, 174, 176, 179, 181, 182, 183, 428/184, 185
  See application file for complete search history.

(56) References Cited

U.S. PATENT DOCUMENTS

| | | |
|---|---|---|
| 7,978,416 B2 | 7/2011 | Crosby et al. |
| 8,636,937 B2 | 1/2014 | Zhang et al. |
| 8,834,146 B2 | 9/2014 | Saha et al. |
| 2008/0026329 A1 | 1/2008 | Vaziri et al. |
| 2009/0297776 A1 | 12/2009 | Crosby et al. |
| 2010/0116430 A1* | 5/2010 | Yang ............... C23C 26/00 156/275.7 |
| 2014/0017454 A1 | 1/2014 | Boyce et al. |
| 2014/0199518 A1 | 7/2014 | Yu et al. |

OTHER PUBLICATIONS

Yasuaki Tokudome, Kazumasa Suzuki, Takuya Kitanaga & Masahide Takahashi, Hierarchical Nested Wrinkles on Silica-Polymer Hybrid Films:Stimuli-Responsive Micro Periodic Surface Architectures, Scientific Reports, Sep. 21, 2012, 2, 683, Nature Publishing Group, U.K.

Arnaud Chiche, Christopher M. Stafford, Joao T. Cabral, Complex Micropatterning of Periodic Structures on Elastomeric Surfaces, Soft Matter, Sep. 30, 2008, 2360-2364, The Royal Society of Chemistry, U.K.

Jian Yin, Conghua Lu, Hierarchical Surface Wrinkles Directed by Wrinkled Templates, Soft Matter, May 16, 2012, 8(24), pp. 2528-2534, The Royal Society of Chemistry, U.K.

* cited by examiner

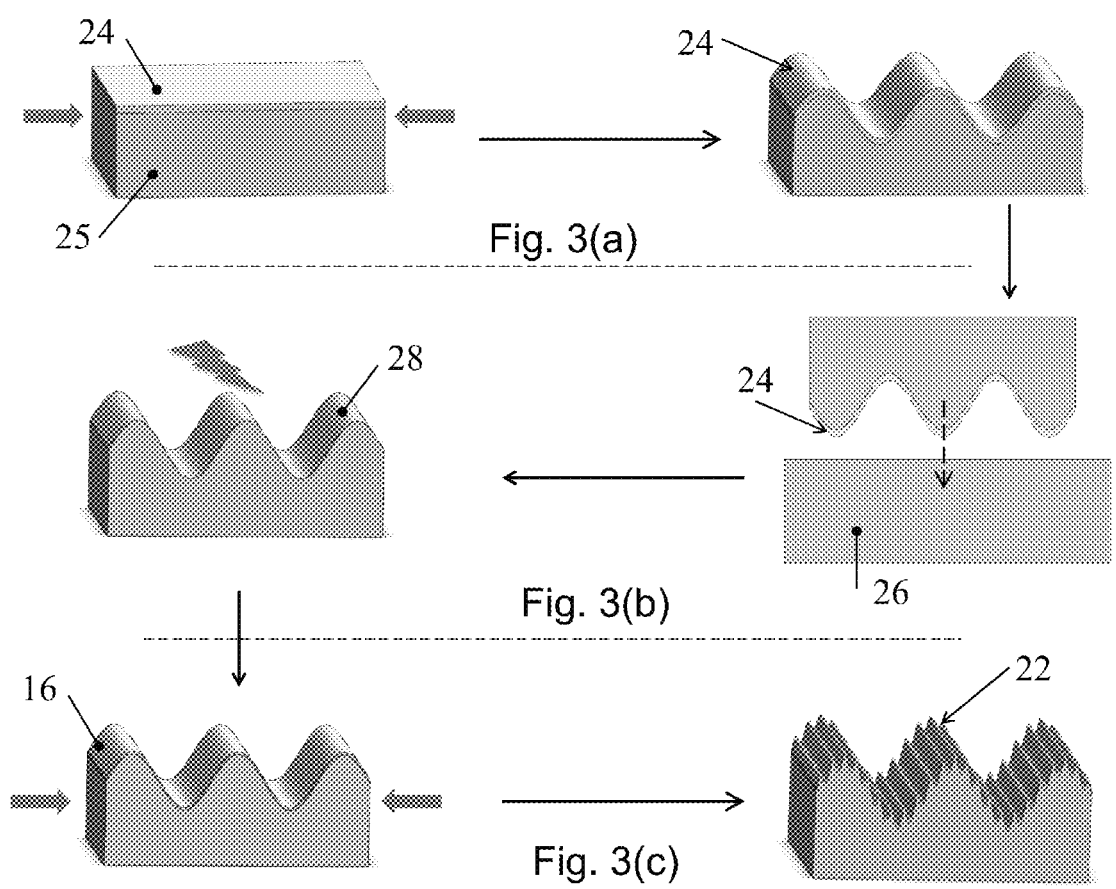

WRINKLED SURFACES WITH TUNABLE HIERARCHY AND METHODS FOR THE PREPARATION THEREOF

BACKGROUND OF THE INVENTION

This invention relates to the low-cost manufacture of a tunable physical topographic pattern and more particularly to the manufacture of micro and nano scale hierarchical periodic wrinkle patterns that are generated upon compression of supported thin films.

Micro and nano enabled devices have the potential to significantly impact diverse fields with direct societal benefits such as energy, water, health, and environment among others. These devices function by actively manipulating matter and/or energy on the micro/nano length scale and often rely on the structure-property relationship to achieve this manipulation. This active manipulation enables using micro/nano enabled products in applications such as (i) fluidics based medical diagnostics, (ii) high-sensitivity sensing of toxic chemicals, and (iii) optoelectronics based chemical and biological sensing. As these devices rely on the structure-property relationship, several different properties can be simultaneously controlled by incorporating different types of structures on the same device. One of the techniques to achieve this is via fabrication of hierarchical structures. A hierarchical structure is one that comprises features on multiple length scales and demonstrates "nested features", i.e., a set of features built on top of another set of features. Each of these set of features may be used to control a different material property. For example, large-scale features in a hierarchical structure may be used to direct/manipulate fluid flow whereas small-scale features may be used to tune the local adhesion/stickiness. Thus, low-cost fabrication of hierarchical micro/nano structures is essential if one desires affordable manufacturing of multi-function micro/nano enabled devices.

Current processes for fabricating micro/nano scale hierarchical structures are primarily limited in terms of the (i) cost and scalability of fabrication and (ii) tunability of hierarchy. At present, hierarchical micro/nano structures are fabricated via a combination of two or more substantially different fabrication processes. This leads to manufacturing challenges in terms of throughput, cost, and/or scalability as one needs to satisfy the requirements for multiple processes. Additionally, it is infeasible to tune/modify the hierarchy after the patterns have been fabricated. For example, it is currently not possible to deterministically switch a pattern across non-hierarchical and hierarchical states or to change the relative "strength" of the individual patterns within the overall composite pattern. This inability to tune the hierarchy prevents one from applying hierarchical structures to build tunable "smart" sensors and devices. Thus, there is a need to develop fabrication processes for scalable and affordable manufacturing of tunable hierarchical micro/nano scale structures. Herein, a scalable and affordable process to fabricate tunable hierarchical structures via a single fabrication process is disclosed. This fabrication process was developed by performing wrinkling of pre-patterned surfaces wherein the pre-patterned surfaces are also fabricated via wrinkling.

Wrinkling of thin films is an affordable and scalable process for fabricating periodic sinusoidal patterns over large areas. Wrinkled patterns are formed on supported thin films as a result of buckling-based instabilities and the mechanism is similar to Euler buckling of beams under compressive loads. A schematic of this process is illustrated in FIG. 1. Essential elements of a system that demonstrates wrinkle formation are: (i) a film 10 that is thin relative to the base, (ii) mismatch in the elastic moduli of the film and the base 12 with the film being stiffer than the base, and (iii) loading conditions that generate in-plane compressive strain ($\epsilon$) in the film. In such bilayer systems, the state of pure compression becomes unstable beyond a critical strain and wrinkles are formed via periodic bending of the film/base. The period of wrinkles ($\lambda$) is determined by the competing dependence of strain energy on period in the film versus in the base. The amplitude (A) is determined by the amount of applied compressive strain. Several different techniques have been developed in the past to (i) generate and join/bond the film to the base, (ii) generate moduli mismatch, and (iii) apply uniaxial and biaxial strains to the film. During compression of flat/smooth films, one is limited to a single period wrinkled pattern even with all of these different combinations of techniques. Thus, to obtain hierarchical wrinkled patterns one must start with non-flat film geometry.

Although fabrication of hierarchical wrinkled patterns has been demonstrated in the past, current techniques for wrinkling have major limitations that prevent one from using these techniques in a manufacturing environment. These limitations are: (i) inability to accurately predict the resulting pattern for a given set of process parameters and (ii) inability to perform inverse pattern design; i.e., inability to predictively design and fabricate the desired hierarchical patterns by combining several patterns. Thus, using current techniques one can fabricate some form of hierarchical wrinkles but not the desired targeted hierarchical pattern. This makes it impossible to use the current techniques to (i) deterministically switch between hierarchical and non-hierarchical states and (ii) predictively tune the relative strength of the individual periodicities in the composite pattern.

Herein, a technique to deterministically tune the hierarchy of a wrinkled surface is disclosed. The technique is based on the discovery that the hierarchical form during compression of a non-flat bilayer emerges with increase in the compressive strain. This emergence phenomenon has been exploited here to design and fabricate wrinkled surfaces with tunable hierarchy wherein the hierarchical form is tuned via the applied compressive strain. A schematic representation of emergence of hierarchy with compression is illustrated in FIG. 2. This disclosure presents: (i) the process scheme for fabricating hierarchical patterns 22 from wrinkling of pre-patterned surfaces 16, (ii) the tools that enable controlling the parameters during the fabrication process, and (iii) model-driven design of such bilayer systems that demonstrate tunable hierarchy. In combination, these tools and techniques enable one to (i) predictively design and fabricate hierarchical patterns at $\frac{1}{10}^{th}$ of the cost of the existing processes and (ii) deterministically tune the hierarchical form.

SUMMARY OF THE INVENTION

The process of generating tunable hierarchical wrinkle patterns consists of the following steps: (1) generating the wrinkled pre-pattern via compression of a polymer bilayer comprising a thin hard film 24 on top of a soft compliant base 25, (2) transferring this pre-pattern geometry onto a base layer 26 via imprinting, (3) generating a pre-patterned bilayer by depositing a thin film 16 on top of the patterned base 28, and (4) performing compression of this patterned bilayer. A schematic of the process is illustrated in FIGS. 3(a), 3(b), and 3(c). During step (1), 1-D wrinkle patterns are obtained upon uniaxial compression via periodic bending of the bilayer surface. The period and amplitude of the pre-pattern can be tuned by controlling the thickness of the hard thin film, material properties of the bilayer, and the applied compressive strain. The period and amplitude of the emerging wrinkles can also be tuned by controlling these parameters during steps (3) and (4). As these parameters can be independently tuned between steps (1), (3) and (4), a variety of different hierarchical wrinkle patterns can be obtained by combining the two patterns. Upon compression of the pre-patterned bilayer during step (4), one observes that first the pre-patterned mode 20 persists with a growth in amplitude and then the mode transitions over to a hierarchical pattern 22 beyond a threshold compression. The patterns are reversible between the pre-pattern 20 and the hierarchical pattern 22 with reduced/increased compression around this threshold. Thus, tunable hierarchical patterns are be obtained by controlling the compression during the final step. These patterns find applications in the fabrication of tunable optical sensors and tunable microfluidic circuits among others.

To be able to satisfactorily implement the process scheme described above, one requires tools that would enable controlling the process parameters during steps (1)-(4). These tools must: (i) control the applied compressive strains during steps (1) and (4), (ii) control the imprinting process for accurate pre-pattern transfer during step (2) and (iii) accurately align the pre-patterns to the direction of subsequent loading during step (4). The biaxial tensile stage that is used for controlling the compressive strains has been disclosed elsewhere in U.S. patent application Ser. No. 14/590,448 titled "Biaxial Tensile Stage for Fabricating and Tuning Wrinkles". Herein, the tools and techniques for controlling the imprinting and alignment processes are disclosed. A well-controlled imprinting process is achieved by performing delayed imprinting, i.e., by imprinting the pre-pattern onto the base material while the base material is partially cured. Accurate alignment of pre-pattern to loading direction is achieved by a gradual alignment scheme. In this scheme, surface-to-edge alignment is first achieved via alignment marks and then conformal surface-to-surface alignment is achieved via gradual engagement.

In addition to the process scheme and the tools, one must carefully design the pre-patterned bilayer systems if deterministic tenability of hierarchy is desired. This is necessary to ensure that the transition of the pre-pattern into the hierarchical mode occurs at a practically feasible compressive strain. Thus, not all possible combinations of pre-patterns and process parameters will result in practical tunable systems. To select the "right" set of process parameters, an analytical physics-based model of the process has been developed. This model predicts the critical strain for pre-pattern to hierarchy transition and guides the design of tunable bilayer systems. Herein, the set of process parameters that deterministically demonstrate tunability of hierarchy is disclosed.

BRIEF DESCRIPTION OF THE DRAWINGS

FIGS. 3(a), 3(b), and 3(c) are illustration of the process scheme for fabricating tunable hierarchical wrinkles wherein the pre-pattern is also fabricated via wrinkling. FIG. 3(a) illustrates generation of pre-pattern. FIG. 3(b) illustrates imprinting of pre-pattern and generation of pre-patterned bilayer. FIG. 3(c) illustrates the generation of hierarchical wrinkles via compression of pre-patterned bilayer.

FIG. 4(a) illustrates stretching of PDMS base. FIG. 4(b) illustrates plasma oxidation. FIG. 4(c) illustrates release of prestretch. FIG. 4(d) illustrates the resulting wrinkle pattern.

FIG. 8(a) is an atomic force microscopy image and FIG. 8(b) is an optical image.

DESCRIPTION OF THE PREFERRED EMBODIMENT

A hierarchical wrinkle pattern is one that comprises more than one spatial frequency, i.e., hierarchical wrinkle patterns demonstrate periodic sinusoidal patterns of one period built on top of patterns of another period. In general, hierarchical patterns may demonstrate hierarchy on several length scales, i.e. patterns with several different periods. In the preferred embodiment, fabrication of tunable hierarchical wrinkle patterns with two spatial periods is presented.

Tunable hierarchical wrinkle patterns are generated by performing a series of two wrinkle-patterning operations with an intermediate imprinting pattern transfer process between the two steps. This scheme is illustrated in FIGS. 3(a), 3(b), and 3(c). In the first wrinkle-patterning step one starts with a flat non-patterned bilayer system, whereas in the last wrinkle-patterning step one starts with a pre-patterned non-flat bilayer surface. Herein, the process for wrinkling of non-patterned flat bilayer systems via compression is presented first and then the process of pattern transfer via imprinting is presented. The final step of wrinkle formation via compression of pre-patterned bilayer is identical to the first wrinkle formation step.

Figure 1A:
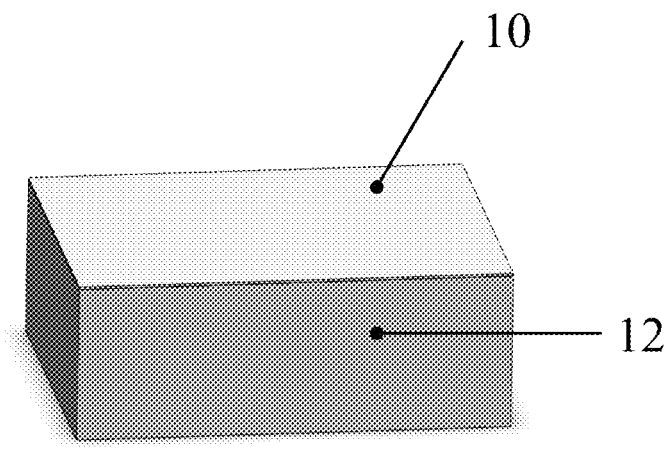
FIGS. 1(a) and 1(b) are schematic illustration of wrinkle formation during compression of a flat non-patterned bilayer system.
Figure 1B:
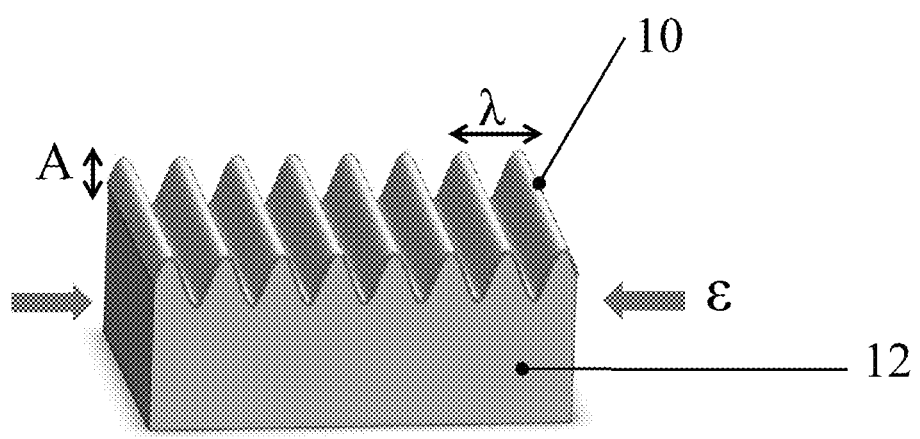
Figure 2:
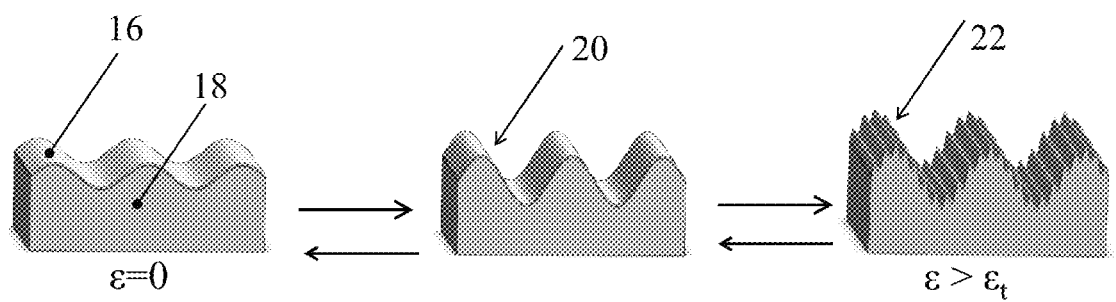
FIG. 2 is a schematic illustration of the phenomenon of emergence of hierarchy during compression of pre-patterned bilayers.
Figure 4A:
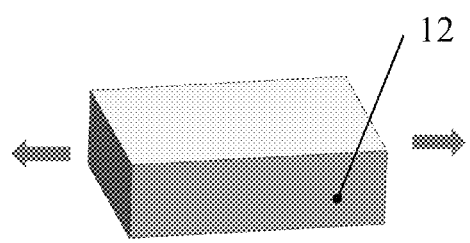
FIGS. 4(a), 4(b), 4(c), and 4(d) are schematic illustration of the process of wrinkle fabrication via a prestretch based film compression technique.
Figure 4B:
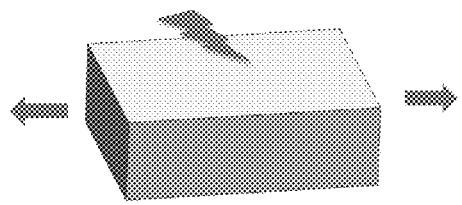
Figure 4C:
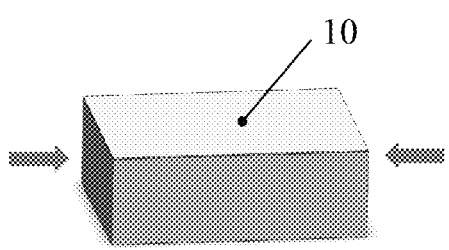
Figure 4D:
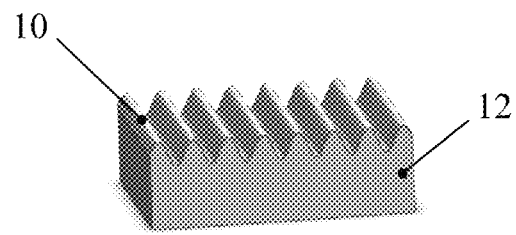

A schematic of wrinkle pattern formation is depicted in FIG. 1. To enable the fabrication of wrinkle patterns, one must solve these sub-problems: (i) fabrication of a bilayer system with the desired material properties and geometry and (ii) compression of the top stiff film.

Stretchable bilayers with large stiffness ratio can be fabricated by attaching or growing a thin stiff film 10 on top of a thick elastomeric base 12. For example, exposing a polydimethylsiloxane (PDMS) film to air or oxygen plasma leads to the formation of a thin glassy layer on top of the exposed PDMS surface via oxidation. Alternatively, a metallic or polymeric thin film may be deposited on top of PDMS to obtain the desired bilayer. The top layer thickness can be tuned by controlling the duration of plasma oxidation or the deposition process; whereas the stiffness ratio may be tuned by selecting the appropriate top/bottom materials. In the preferred embodiment of the tunable patterns, both plasma oxidation and metal/polymer film deposition techniques are used to generate a stiff thin film on top of an elastomeric PDMS layer.

Compression of the top film can be achieved by either directly compressing the bilayer or by generating a residual compressive strain in the top layer. As direct compression requires sustained loading to maintain the wrinkles, residual compression is often the preferred scheme. During mechanical loading, residual compression is generated by first stretching the PDMS base and then attaching/growing the stiff film on top of this pre-stretched base layer. On releasing the prestretch in the PDMS, the top layer undergoes compression that leads to formation of wrinkles. In the preferred embodiment of the pre-patterned bilayer, the prestretch is selected to be sufficiently high so that the transition compressive strain can be achieved during release of the prestretch.

Figure 5A:
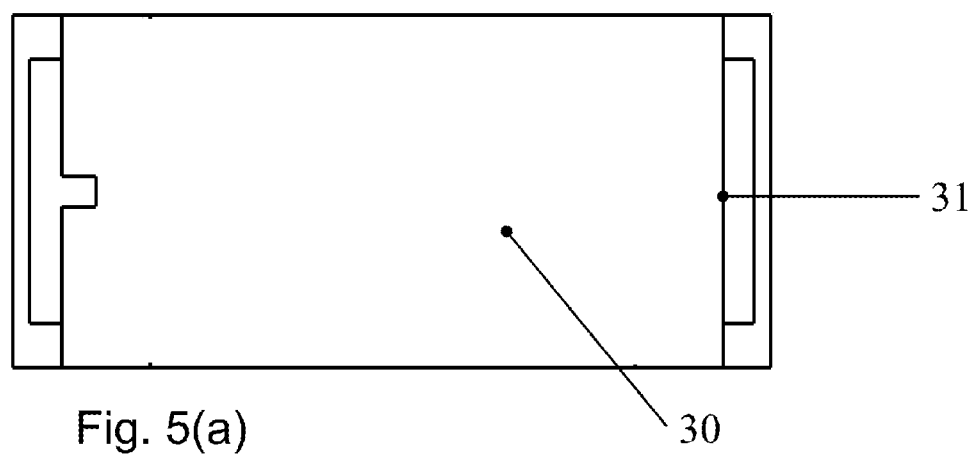
FIGS. 5(a) and 5(b) are top and front views of a PDMS coupon that is uniaxially stretched.
Figure 5B:

The steps of the wrinkle fabrication process are illustrated in FIGS. 4(a), 4(b), 4(c), and 4(d). The steps are (i) fabricating the base PDMS film 12, (ii) clamping the PDMS film in a tensile stage, (iii) extension of the PDMS film, (iv) plasma oxidation of the stretched PDMS film or deposition of metallic/polymeric thin film 10, and (v) release of the prestretch in the PDMS film. The base PDMS films were fabricated by casting and thermally curing the commercially available Sylgard 184 two-part silicone elastomer mixture in a ratio of 1 part curing agent to 12 parts resin by weight. Rectangular coupons with a stretched length of 37.5 mm, a clamped width of 20 mm, and a thickness of 1.9-2.2 mm were cut of the cast PDMS films. The film is illustrated in FIGS. 5(a) and 5(b). To align the edges of the PDMS coupon 30 to the stretching direction, alignment features 32 were generated on the bottom surfaces 33 of the films by incorporating them directly into the molds used for curing. The edge 31 corresponding to these alignment marks is aligned perpendicular to the uniaxial stretch direction. These alignment features (i) ensure that the length of the stretched section is accurately known during stretching and (ii) act as reference features for alignment of the pre-patterns to the direction of stretching during the final wrinkling step.

Figures 6A, 6B:
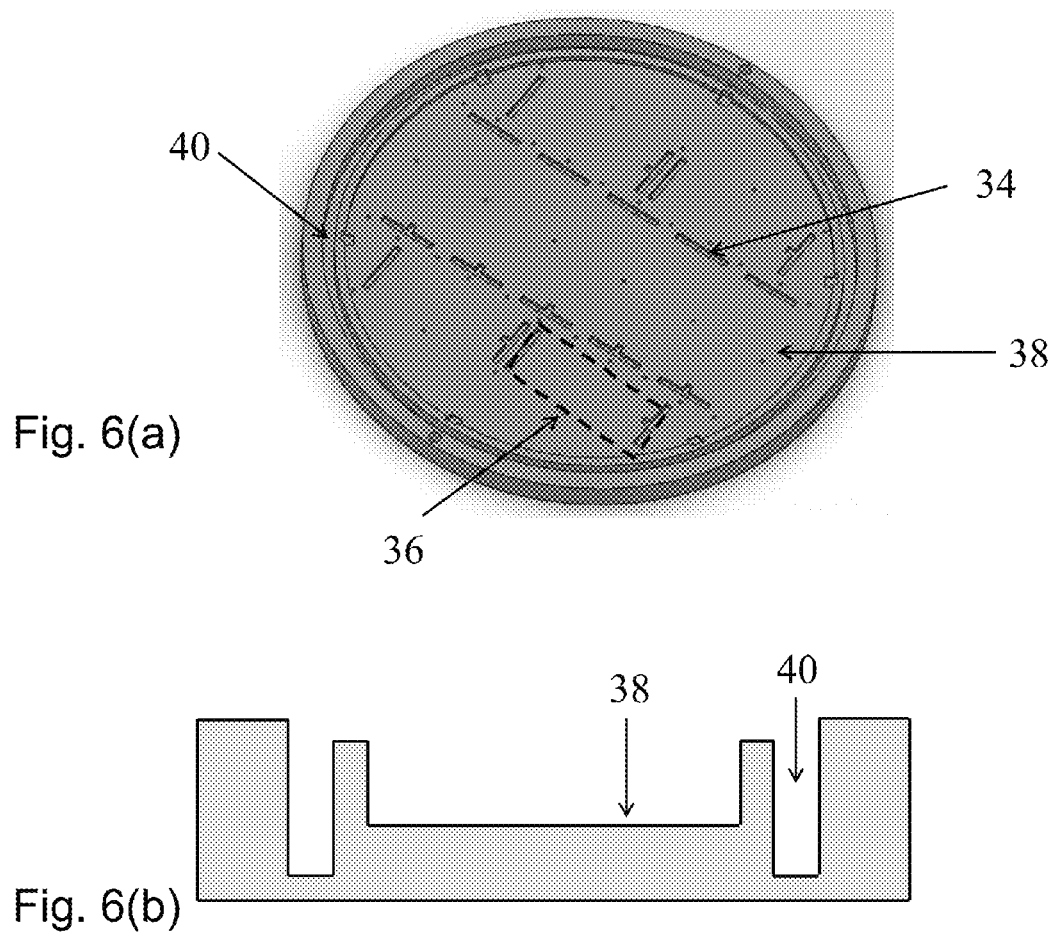
FIG. 6(a) is a perspective view of the mold that is used for casting and curing of PDMS films.
FIG. 6(b) is a cross-sectional view of the mold.

The mold geometry is illustrated in FIGS. 6(a) and 6(b). The mold consists of a cylindrical casting reservoir 38 that is 150 mm in diameter and has a nominal height of 2 mm. The casting reservoir is surrounded by an overflow reservoir 40 that holds any excess PDMS that overflows from the casting reservoir. This feature ensures that the maximum thickness of the PDMS films is limited to the height of the casting reservoir. Films below this thickness may be fabricated by controlling the amount of pre-cured PDMS that is poured into the casting reservoir. Variations in thickness across the casting surface can be reduced by holding the mold surface level with respect to the gravitational field. For example, this may be achieved by performing the thermal curing operation on a hot plate that is itself kept on top of an optical table. To ensure that featureless flat films are available for patterning, only the top surface of the films is used for patterning wrinkles. The stretched length of the films is held uniform across different samples by incorporating alignment features 34 into the molds. These mold features ensure that each PDMS coupon 30 has well characterized alignment features built into it during the casting/curing process. The coupons can be cut out of the cast PDMS films by tracing out the outline 36 of the coupons.

During the first step of wrinkle formation on flat bilayers, the full prestretch in the bilayer is released to generate the wrinkles that are used as the pre-pattern for the subsequent steps. During the last step of wrinkle formation on pre-patterned bilayers, the prestretch is partially released to tune the resultant hierarchical pattern.

Figure 7A:
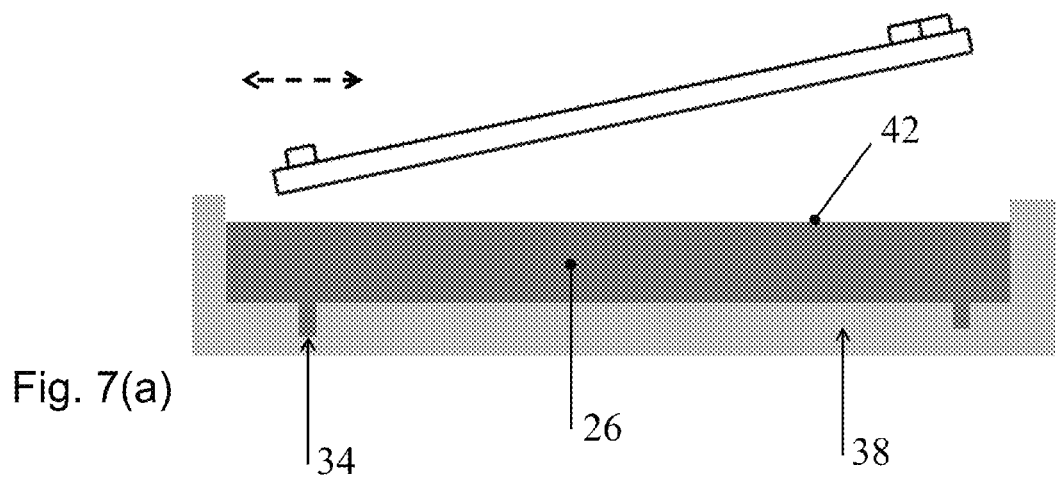
FIGS. 7(a) and 7(b) are schematic illustrations of the gradual alignment and imprinting process.
Figure 7B:
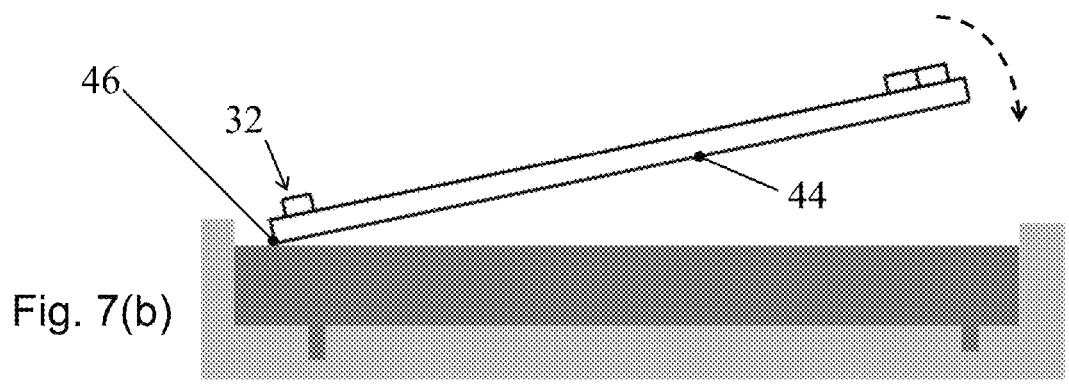

The pre-patterned bilayers are fabricated on PDMS by using the wrinkled surfaces as the molds/templates to generate the top surface of the PDMS casts. The curing process for fabrication of the pre-patterned base is same as that for the first wrinkling step presented above with the additional step of imprinting the pre-pattern onto the PDMS material during curing. Imprinting is performed by "gently" placing the pre-patterned coupon on top of the exposed surface of the curing PDMS while taking care that the patterned surface 44 is oriented toward the curing material 42. The imprinting process is illustrated in FIGS. 7(a) and 7(b).

A well-controlled imprinting process is essential to fabricate the desired hierarchical patterns by ensuring accurate pre-pattern replication. Factors during imprinting that influence pattern replication are (i) contact force, (ii) uniformity of contact with minimum bubbles/gaps, and (iii) alignment of pre-patterns to the direction of subsequent stretching. To ensure a well-controlled imprinting process, a protocol was developed. This protocol is listed in Table 1.

TABLE 1

Protocol for imprinting pre-patterns on PDMS

| # | Step | Protocol |
|---|------|----------|
| 1 | Mixing of two-part PDMS (resin + curing agent) with curing ratio of 1 part curing agent for 'r' part resin; r ∈ [6, 15] | r = 12 or r = 15 |
| 2 | Degassing of the two part mixture under vacuum pressure $P_d$ for $t_d$ minutes | $P_d <= -28.5$ inHg, $t_d = 20$ minutes |
| 3 | Pouring two part mixture onto aluminum mold. The mold is held at constant temperature $T_L$ using a hot plate | $T_L = 65°$ C. |
| 4 | Low temperature curing up to gelation point: Mold held at constant temperature $T_L$ for $t_l$ minutes | $T_L = 65°$ C., $t_l = 20$ min |
| 5 | Imprinting pre-pattern onto the top surface of PDMS mold $t_i$ minutes after start of curing | 6 min < $t_i$ < 8 min |
| 6 | High temperature curing: increasing mold temperature to $T_H$ after $t_l$ minutes of pouring and holding this temperature for $t_h$ minutes. | $T_H = 165°$ C., $t_h = 15$ min |
| 7 | Taking mold off the heater and then placing it on aluminum thermal sink that is maintained at room temperature for at least $t_s$ minutes | $t_s = 10$ min |

In the presence of insufficient contact force, PDMS does not flow into the pre-pattern; whereas high contact force leads to excess flow of PDMS under the pre-pattern and a thinner-than-desired casting. The sensitivity of flow to contact force decreases as curing proceeds due to the increase in viscosity of PDMS. Therefore, delayed imprinting is performed, i.e., imprinting close to, but before, the gelation point instead of at the beginning of the curing process. One must be careful not to cross the gelation point as the phase change at this point prevents pattern replication.

To ensure uniform contact and to align the pre-patterns along the stretch direction, a gradual imprinting/alignment scheme was developed. This scheme is illustrated in FIGS. 7(a) and 7(b). Steps of this scheme are: (i) in-plane alignment of one of the edges 46 of the pre-patterned bilayer coupon to the alignment features 34 that are pre-fabricated on the PDMS mold, (ii) bringing the aligned edge into contact with the curing material, and (iii) gradually bringing the rest of the pre-pattern coupon into contact with the curing material. During gradual contact, alignment is maintained due to the no-slip condition that exists along the initial contact edge 46; uniformity of the contact can be verified by visual inspection of the moving contact meniscus.

The process schemes and techniques described above enable one to fabricate wrinkled patterns via compression of pre-patterned bilayers but are not sufficient when deterministically tunable hierarchical patterns are desired. For deterministic tunability, in addition to the process schemes and techniques one must also select the "right" set of process parameters to design the bilayers. This set of "right" parameters is presented below.

The geometric parameters that are relevant to predictive design of tunable hierarchical wrinkles are: (i) the period ($\lambda_p$) of the pre-pattern, (ii) the amplitude of the pre-pattern ($A_p$), (iii) the period of the natural pattern ($\lambda_n$), and (iv) the amplitude of the natural pattern ($A_n$). The natural pattern is the hypothetical pattern that would have been observed for an un-patterned flat bilayer that has the same material properties as the pre-patterned bilayer and is compressed by the same amount. During design and prediction, the effect of material properties and compression is indirectly accounted for by the natural period and amplitude; whereas the pre-pattern accounts for the geometric effect. As the period and amplitude of the pre-patterns and natural patterns can be independently tuned, different types of hierarchical patterns is feasible.

As the pre-patterns are fabricated via wrinkling, only a limited set of pre-patterns are available. For uniaxial stretching, this set comprises 1-D sinusoidal periodic patterns over a finite range of period ($\lambda_p$) and amplitude ($A_p$). The feasible range of period and amplitude can be obtained from the fabrication constraints. Fabrication constraints arise due practical limitations such as resolution of vision system, overheating during plasma oxidation or metal deposition, and failure/tearing of PDMS during stretching. During fabrication of wrinkles, period is controlled via the exposure time during plasma oxidation and amplitude is controlled via stretching of PDMS. Additionally, both period and amplitude may be tuned over a small range by tuning the PDMS curing ratio, i.e., by tuning the Young's modulus of PDMS. Thus, fabrication constraints can be linked to the feasible range of period and amplitude by quantifying the feasible range of (i) PDMS stretching ($\varepsilon$), (ii) exposure time during plasma oxidation ($t_e$), and (iii) Young's modulus of PDMS. Out of these available pre-patterns and natural patterns, only a subset would lead to tunable hierarchical patterns. To determine that set, an analytical model of the process was developed.

Hierarchical patterns are formed as result of the competition and combination of two distinct modes of the wrinkled system. These two modes are (i) pre-pattern that is imprinted onto the bilayer and (ii) natural pattern of the corresponding flat bilayer system. The natural pattern of the flat bilayer system is determined by the thickness of the top film, mechanical properties of the bilayer, and the applied strain. The contribution of each of these modes to the overall mode shape is determined by the applied compression. Below a critical threshold compressive strain, the pre-pattern mode is energetically favorable. Thus, during initial compression of the pre-patterned bilayer a non-hierarchical single period mode is observed. As the compression is increased, the natural mode becomes energetically favorable. Thus, a combination of the pre-pattern and the natural mode is observed during subsequent compression. The critical compression threshold can be predicted in terms of the pre-pattern and the natural pattern of the bilayer.

Figure 8A:
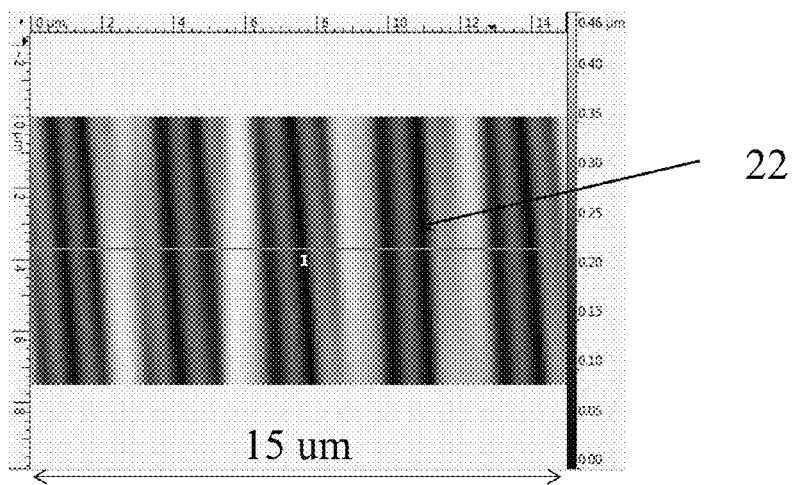
FIGS. 8(a) and 8(b) are images of hierarchical wrinkled patterns that were fabricated via compression of pre-patterned bilayers wherein the pre-patterns were also fabricated via wrinkling.
Figure 8B:
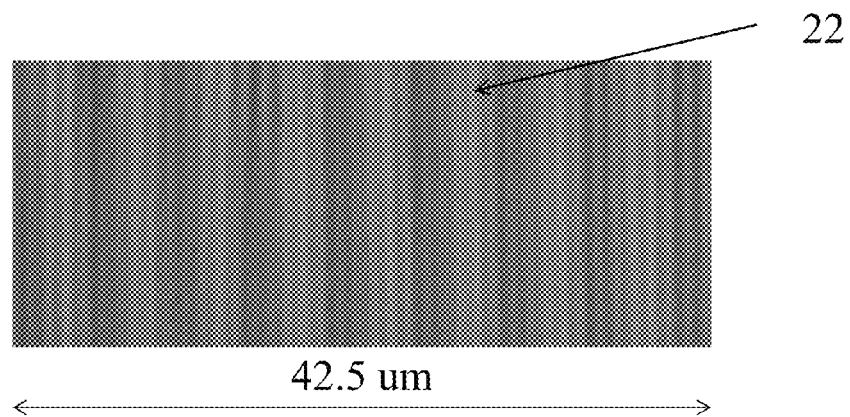

Pre-patterning a bilayer system changes the wrinkling process in two ways: (i) pre-patterning the surface provides a lower energy pathway to bending deformation as compared to the case of a flat surface, (ii) pre-patterning with a period that is not the natural period of the flat system leads to an energy penalty. The energy penalty arises as the natural period of the flat system (by definition) is the lowest energy mode for a flat system. Thus, the first effect causes the pre-patterned mode to have a lower energy whereas the second effect causes it to have a higher energy. The energy penalty remains independent of the applied compression; however, the energy advantage decreases with compression. Thus, beyond a critical threshold the pre-patterned mode becomes energetically unfavorable. Beyond that compression, the natural mode emerges in addition to the pre-patterned mode. This results in the formation of a complex hierarchical mode. Examples of fabricated hierarchical wrinkle patterns are shown in FIGS. 8(a) and 8(b).

A model of the process has been developed that captures the essential physics discussed above. The pre-pattern is quantified in terms of the pre-pattern period ($\lambda_p$) and the amplitude ($A_p$); similarly, the natural pattern is characterized by the natural period ($\lambda_n$) and the amplitude ($A_n$). These parameters are represented in terms of the non-dimensional parameters as: $m=(\lambda_p/\lambda_n)$ and $n=(A_p/A_n)$. The natural amplitude can be represented in terms of the applied compression ($\varepsilon$) as: $A_n=(\lambda_n/\pi)\varepsilon^{0.5}$. The natural period of the system is independent of the applied compression and depends only on the top film thickness and the material properties of the pre-patterned bilayer.

The energy advantage due to pre-patterning is given by: $(E_{p,n}/E_n)=1-2[\{\eta(1+\eta)\}^{0.5}-\eta]$. Here, $E_{p,n}$ is the energy of a pre-patterned bilayer with the same period as the natural period, $E_n$ is the energy of the hypothetical flat bilayer, and $\eta=n^2/m^2$. The energy penalty due to non-natural mode is given by: $(E_{p,p}/E_{p,n})=\{(1+2\ m^3)/(3\ m^2)\}$. Here, $E_{p,p}$ is the energy of a pre-patterned bilayer with a pre-pattern period that is different from the natural period. The critical compression is achieved when $E_{p,p}=E_{p,n}$. Thus, the critical condition is given by: $n_c=|1+2\ m^3-3\ m^2|/\{12(1+2\ m^3)\}^{0.5}$. Here, $n_c$ is the critical amplitude ratio and |.| is the absolute value operator.

Figure 9:
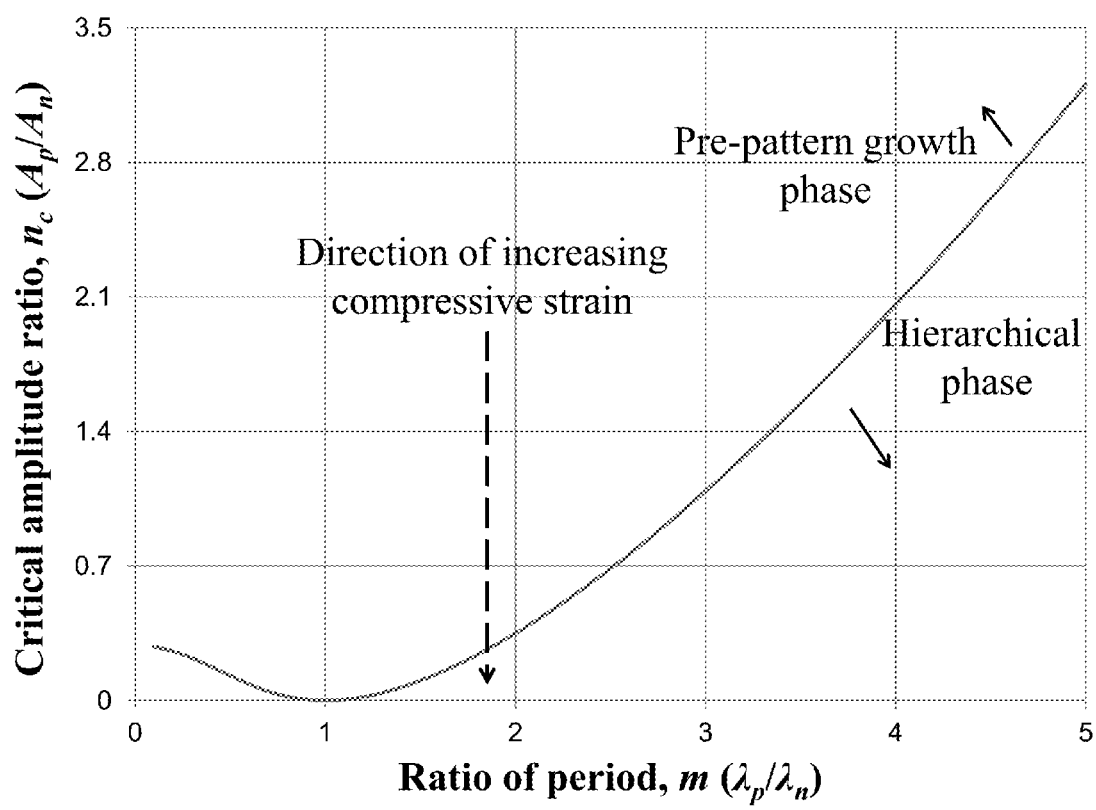
FIG. 9 is an illustration of the dependence of the critical amplitude ratio on the ratio of pre-pattern and natural periods.

When the compressive strain in a pre-patterned bilayer is increased, the amplitude ratio increases. At the onset of compression, the amplitude ratio 'n' is close to infinity as the amplitude of the natural period is zero. With increasing compressive strain, the natural amplitude of the hypothetical equivalent flat bilayer increases along with a decrease in the amplitude ratio 'n'. As long as the amplitude ratio remains higher than the critical amplitude ratio '$n_c$', only the single-period pre-pattern exists. Physically, this manifests as an increase in the amplitude of the pre-patterned mode. With further compression, hierarchical patterns emerge when the amplitude ratio 'n' falls below the critical amplitude ratio '$n_c$'. This critical ratio is illustrated in FIG. 9 and depends only on the period ratio 'm'. As this condition is independent of the material properties, it is applicable to all combinations of bilayer materials. The corresponding critical compressive strain is given as: $\varepsilon_t = \{\pi(A_p/\lambda_p)(m/n_c)\}^2$.

When tunable hierarchical systems are desired, one must select the process parameters such that (i) the observed amplitude ratio 'n' is close to the critical amplitude ratio '$n_c$' and (ii) the prestretch in the pre-patterned bilayer is sufficiently high so that the amplitude ratio can cross over the critical value upon full prestretch release. The period ratio must be selected based on the desired application. For example, if a tunable optical sensor in the visible spectrum is desired, then one may select the pre-pattern as $\lambda_p = 700$ nm and $A_p = 15$ nm and the period ratio 'm' as 2. The corresponding critical amplitude ratio is $n_c = 0.35$. Thus, the prestretch in the pre-patterned bilayer must be at least 14.8% to achieve hierarchical patterns. If a prestretch below this value is applied then hierarchical patterns cannot be obtained even upon full prestretch release; instead, one would observe an increase in the pre-pattern amplitude.

Another application of tunable hierarchical patterns is a tunable microfluidic channel wherein the pre-pattern is used as a channel for fluid flow and the hierarchical pattern is used as small-scale features that control the surface roughness of the channels. In this application, one may select the pre-pattern as $\lambda_p = 5$ um and $A_p = 500$ nm and the period ratio 'm' as 10. The corresponding critical amplitude ratio is $n_c = 10.98$. Thus, the prestretch in the pre-patterned bilayer must be at least 8.2% to achieve hierarchical patterns. When the prestretch in the pre-patterned bilayer is not released, a smooth channel is obtained. Upon release of the prestretch beyond 8.2%, a rough surface is observed. This rough surface results due to the emergence of the hierarchical wrinkles. The surface roughness of the channels can be tuned by further releasing the prestretch.

The process schemes, techniques, and the bilayer design disclosed here enable one to fabricate hierarchical wrinkled patterns wherein the hierarchy can be deterministically tuned via compression.

It is recognized that modifications and variations of the present invention will be apparent to those of ordinary skill in the art and it is intended that all such modifications and variations be included within the scope of the appended claims.

In one variation, the pre-patterns may be fabricated by a process other than wrinkling. In such a scheme, the manufacturing advantages of using a single fabrication process are lost. However, such a scheme may be necessary when pre-patterns are desired outside the feasible range of pre-patterns that can be fabricated via wrinkling. For example, pre-patterns may be fabricated via an alternate process when large amplitudes are desired. Even in such a scenario, the subsequent steps of pre-pattern imprinting and compression of pre-patterned bilayers can be used to fabricate tunable hierarchical patterns.

In another variation, biaxial strains can be applied during pre-pattern generation via wrinkling to generate 2-D periodic patterns. Imprinting this pre-pattern and subsequent compression of the bilayer would lead to the generation of an asymmetrical complex hierarchical pattern.

In another variation, biaxial strain may be applied during compression of the pre-patterned bilayer with a uniaxially generated pre-pattern. This scheme would also lead to generation of an asymmetrical complex hierarchical pattern.

In another variation, the pre-pattern that is generated via uniaxial compression may be aligned at a non-zero angle to the direction of uniaxial prestretch in the pre-patterned bilayer. Alignment marks on the PDMS mold can be used to accurately align the pre-pattern at an angle to the prestretch direction. This scheme would also lead to the generation of asymmetrical complex hierarchical patterns.

What is claimed is:

1. A strain-tunable composite material that demonstrates tunable hierarchy of wrinkle patterns, comprising:
   a bilayer in a state of strain with a topographically pre-patterned and pre-stretched base layer and a thin film on top of the base layer;
   wherein the topographical pre-pattern of the base layer is periodic with a period that is different from the natural period of the bilayer;
   wherein the thin film is joined to and forms a conformal coating on top of the pre-patterned surface of the base layer;
   wherein the bilayer has a predetermined state of strain in the configuration when no prestretch in the pre-patterned base layer has been released; and
   wherein the predetermined state of strain in the bilayer is a state in which the thin film is free of compressive strain and the tensile strain in the base layer along the direction of periodicity of the topographical pre-pattern is above a non-zero critical strain.

2. The composite material of claim 1, wherein the period of the pre-pattern is not equal to the natural period and is 0.01-100 times that of the natural period.

3. The composite material of claim 1, wherein the critical strain is determined by the mathematical relationship:

$$\varepsilon_t = 12m^2(1+2m^3)[\pi A_p/\{\lambda_p(1+2m^3-3m^2)\}]^2; \text{ and}$$

wherein '$\varepsilon_t$' is the critical strain, 'm' is the ratio of period of pre-pattern to natural period, '$A_p$' is amplitude of the pre-pattern and '$\lambda_p$' is the period of the pre-pattern.

4. The composite material of claim 1, wherein the strain in the base layer is along a single axis.

5. The composite material of claim 1, wherein the periodic pre-pattern comprises sinusoidal patterns.

6. The composite material of claim 1, wherein the direction of periodicity of the topographical pre-pattern is aligned along a direction of stretch of the base layer.

7. The composite material of claim 1, wherein the direction of periodicity of the topographical pre-pattern is aligned at an angle to a direction of stretch of the base layer.

8. The composite material of claim 1, wherein the strain in the base layer is along two different axes.

9. A method of making a strain-tunable composite material that is in the form of a bilayer with a base layer and a top film and wherein the bilayer demonstrates tunable hierarchy of wrinkle patterns, comprising the steps of:
   providing a topographically pre-patterned base layer, wherein the topographical pattern is periodic with a period that is different from the natural period of the bilayer;
   stretching the pre-patterned base layer, wherein the strain in the base layer along the direction of periodicity of the topographical pattern is above a non-zero critical strain, thereby forming a pre-stretched and pre-patterned base layer;
   growing or attaching a thin film on top of the pre-stretched and pre-patterned base layer, wherein the film conforms to the pre-patterned surface and is free of compressive strain, thereby forming a composite pre-patterned material comprising a thin film on top of a pre-stretched and pre-patterned base layer; and
   releasing the strain in the base layer along the direction of periodicity of the topographical pre-pattern, wherein releasing the strain by an amount less than the critical strain causes the amplitude of the pre-pattern to increase, whereas releasing the strain by an amount more than the critical strain causes the thin film to buckle into a periodic pattern with the same period as the natural period and with its direction of periodicity oriented along the direction of the released strain, thereby demonstrating tunable hierarchy of wrinkle patterns.

10. Method of claim 9, wherein the period of the pre-pattern is not equal to the natural period and is 0.01-100 times the natural period.

11. Method of claim 9, wherein the thin film is grown on top of the pre-patterned base layer by exposing it to plasma.

12. Method of claim 9, wherein the thin film is grown on top of the pre-patterned base layer by physical or chemical vapor deposition.

13. Method of claim 9, wherein the critical strain is determined by the mathematical relationship:

$$\varepsilon_t = 12m^2(1+2m^3)[\pi A_p/\{\lambda_p(1+2m^3-3m^2)\}]^2; \text{ and}$$

wherein '$\varepsilon_t$' is the critical strain, 'm' is the ratio of period of pre-pattern to natural period, '$A_p$' is amplitude of the pre-pattern and '$\lambda_p$' is the period of the pre-pattern.

14. An article comprising tunable hierarchical wrinkle patterns formed by the method of claim 9.

15. The composite material of claim 1, wherein the base layer is a replica of a wrinkled surface.

16. The composite material of claim 1, wherein the material of the base layer is polydimethylsiloxane (PDMS).

17. The composite material of claim 1, wherein the thin film is in the form of a plasma exposed top layer of the base layer.

18. The composite material of claim 1, wherein the wrinkle patterns are reversible and revert back to the pre-pattern when the base layer is stretched back to its initial pre-stretched state.

19. The method of claim 9, wherein the topographically pre-patterned base layer is fabricated by replicating a wrinkled surface onto a base substrate.

20. The method of claim 9, further comprising the step of further releasing the stretch in the base layer or stretching the base layer, wherein further releasing the stretch causes an increase in the amplitude of the wrinkle pattern, whereas stretching the base layer back to its initial pre-stretched state causes the hierarchical wrinkle pattern to revert back to the pre-pattern.

21. The method of claim 9, wherein the material of the base layer is polydimethylsiloxane (PDMS).

22. The method of claim 9, wherein the base layer is stretched along a single axis.

23. The method of claim 9, wherein the periodic pre-pattern comprises sinusoidal patterns.

* * * * *

UNITED STATES PATENT AND TRADEMARK OFFICE
CERTIFICATE OF CORRECTION

PATENT NO.         : 10,052,811 B2
APPLICATION NO.    : 14/669925
DATED              : August 21, 2018
INVENTOR(S)        : Sourabh Kumar Saha and Martin Luther Culpepper It is certified that error appears in the above-identified patent and that said Letters Patent is hereby corrected as shown below:

On the Title Page

Item (73) Assignee, should read:
SOURABH KUMAR SAHA

Signed and Sealed this
Thirtieth Day of October, 2018

Andrei Iancu
*Director of the United States Patent and Trademark Office*